(12) United States Patent
Schultz et al.

(10) Patent No.: US 7,028,177 B2
(45) Date of Patent: Apr. 11, 2006

(54) ARRAY CONTROLLER ROM CLONING IN REDUNDANT CONTROLLERS

(75) Inventors: Stephen M. Schultz, Houston, TX (US); Mohammad A. Ramiz, Houston, TX (US); Sohail Hameed, Houston, TX (US); Dan Mazina, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 781 days.

(21) Appl. No.: 10/062,186

(22) Filed: Jan. 31, 2002

(65) Prior Publication Data

US 2003/0145130 A1 Jul. 31, 2003

(51) Int. Cl.
G06F 1/24 (2006.01)
G06F 11/00 (2006.01)

(52) U.S. Cl. .......................... 713/100; 714/12; 714/13

(58) Field of Classification Search ................ 710/22; 711/114; 713/100; 714/12, 13
See application file for complete search history.

(56) References Cited

U.S. PATENT DOCUMENTS

| 5,878,256 | A  | * | 3/1999  | Bealkowski et al. ........... 713/2 |
| 6,065,096 | A  | * | 5/2000  | Day et al. .................... 711/114 |
| 6,085,333 | A  | * | 7/2000  | DeKoning et al. ............. 714/7 |
| 6,675,258 | B1 | * | 1/2004  | Bramhall et al. ........... 711/114 |
| 6,715,101 | B1 | * | 3/2004  | Oldfield et al. ................ 714/11 |
| 6,836,859 | B1 | * | 12/2004 | Berg et al. .................... 714/36 |

* cited by examiner

*Primary Examiner*—Chun Cao
*Assistant Examiner*—Albert Wang

(57) ABSTRACT

A system and method for synchronizing firmware revisions in redundant controllers in a storage system is disclosed. Redundant controllers transmit firmware revision numbers during the establishment of a communication links between the controllers. The revision numbers are compared and, if they are not equal, then controller that possesses the more recent firmware revision transmits its firmware across the communication link to the other controller. The more recent firmware is stored in the memory of the other controller, which is then re-booted to ensure that both controllers are operating with the same firmware. If a failed controller is replaced or rebooted while the other controller remains operational, then the firmware revision from the operational controller is transmitted to the replaced or re-booted controller and stored in its memory. The controller is then re-booted to ensure that both controllers are operating with the same firmware.

14 Claims, 5 Drawing Sheets

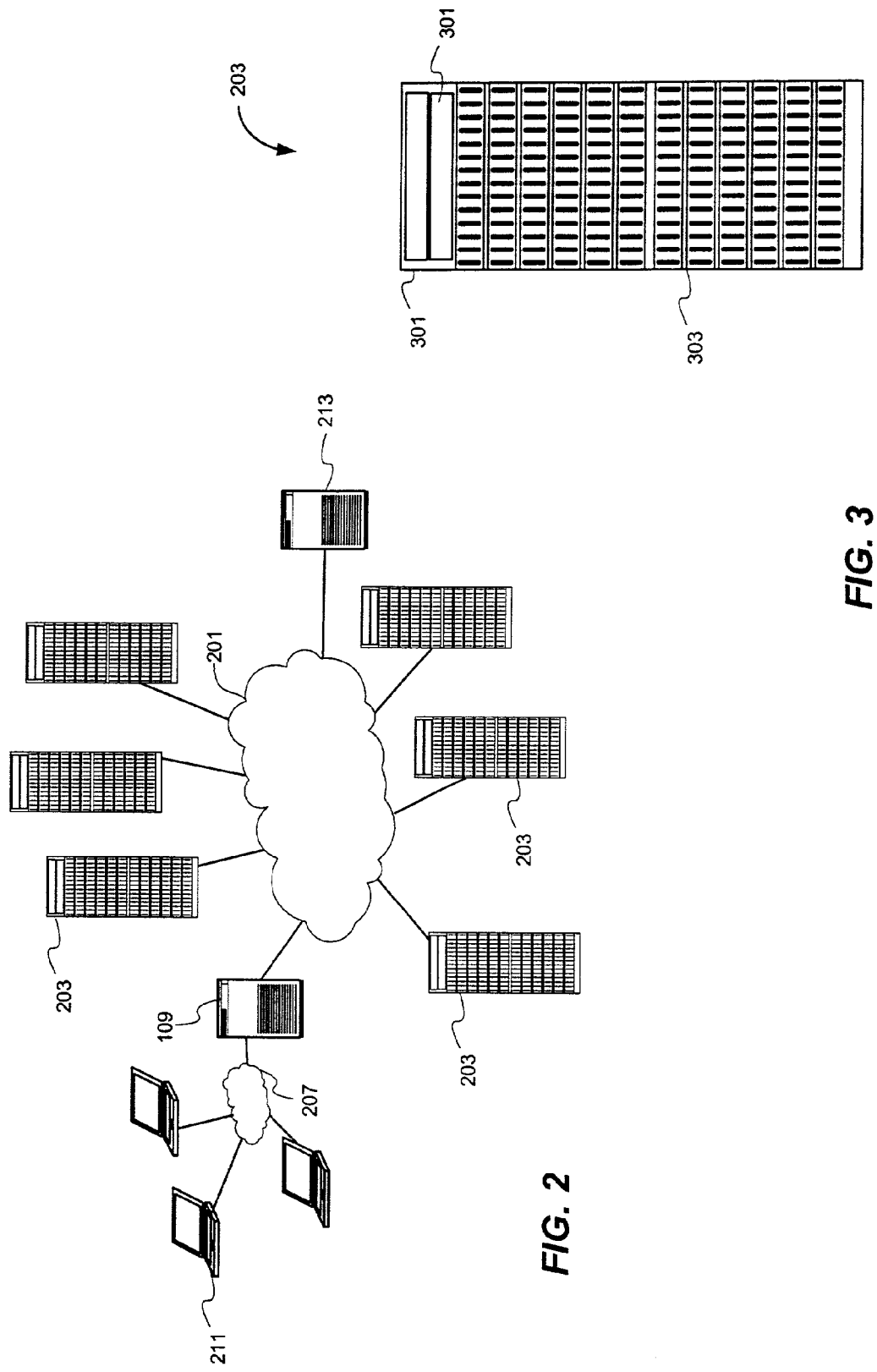

ARRAY CONTROLLER ROM CLONING IN REDUNDANT CONTROLLERS

BACKGROUND OF THE INVENTION

1. Field of the Invention

The present invention relates to computer-based information storage systems. More particularly, the present invention relates to systems and methods for synchronizing firmware resident on redundant controllers in a storage system, e.g., a RAID (Redundant Array of Independent Disks) array storage assembly.

2. Background of the Invention

The increased importance of information technology in business processes has fostered increased demands for data storage systems that combine the features of high storage capacity, high reliability, efficient scalabilty, and cost-effectiveness. Early computer systems relied heavily on direct-attached storage (DAS) systems consisting of one or more disk drives coupled to a system bus. DAS systems were not well adapted to satisfy these demands. More recently, storage area network (SAN) technologies have been implemented. SAN architectures permit organizations to uncouple application servers from data servers to provide storage systems with greater capacity, higher reliability, and higher availability.

SAN systems have implemented RAID (Redundant Arrays of Inexpensive Disks) techniques to enhanced data storage reliability. In addition, SAN systems may implement redundant components such as power supplies, cooling modules, disk devices, temperature sensors, audible and/or visible alarms, and RAID and other controllers to increase system reliability. If a component fails, then the redundant component assumes the functions of the failed component so the storage system can continue operating while the failed component is repaired or replaced.

In operation, remote computing devices may access a storage sub-system through a server that communicates with the storage sub-system. The term file system refers to the logical structures and software routines, usually closely tied to the operating system software, that are used to control access to storage in the system. File systems implement a mapping data structure that associates addresses used by application software to addresses used by the underlying storage layers. While early file systems addressed the storage using physical information about the hard disk(s), existing file systems address logical units (LUNs) that may comprise a single drive, a portion of a drive, or more than one drive.

Storage systems, including SAN file systems retrieve information from the storage media by issuing commands to a disk controller(s), typically through a network connection. A disk controller is a collection of hardware and software routines that translate the file system commands expressed in logical terms into hardware-specific commands expressed in a protocol understood by the physical drives. The disk controller may address the disks physically, however, more commonly a controller addresses logical block addresses (LBAs). The disk drives include a controller that maps the LBA requests into hardware-specific commands that identify a particular physical location on a storage media that is to be accessed.

In many SAN systems, data storage devices (e.g., disk drives) are connected to redundant disk controllers by at least one high-speed data communication link, e.g., a Fibre Channel Arbitrated Loop (FCAL), to provide a network of interconnected storage devices. To function effectively as redundant controllers, the disk controllers must run the same version of firmware on their respective processors. Accordingly, there is a need in the art for systems and methods to ensure that redundant disk controllers are running the same version of firmware in their respective processors.

SUMMARY OF THE INVENTION

The present invention addresses these and other needs by providing a method for ensuring that the same firmware revision resides on redundant controllers in a data storage system and a data storage system adapted to ensure that redundant controllers are running the same version of firmware in their respective processors.

In one aspect, the invention provides a method of synchronizing firmware in redundant controller processors in a storage system. The method comprises the steps of: transmitting, from a first controller to a second controller, first information identifying the revision of firmware in the memory of the first controller; comparing the first information with second information identifying the revision of firmware in the memory of the second controller; if the revisions of firmware are not equal, then copying the firmware from the memory of the first controller to the memory of the second controller.

In another aspect, the invention provides a method of synchronizing firmware in the memory of a controller that has replaced a failed controller with the firmware in the memory of an active controller, comprising the steps of copying the firmware from the memory of the active controller to the memory of the controller that has replaced the failed controller and re-booting the controller that has replaced the failed controller. Advantageously, the method permits a failed controller to be replaced on-line, i.e., without shutting down the storage system, and ensures that the replaced controller and the active controller can function as a redundant controllers.

In yet another aspect, the invention provides a computer-based information storage system. The information storage system includes a plurality of storage devices, a first controller communicatively connected to the plurality of storage devices and including a processor and associated memory, and a second controller communicatively connected to the plurality of storage devices and to the first controller and including a processor and associated memory. The processors include logic for transmitting, from the first controller to the second controller, first information identifying the revision of firmware in the memory of the first controller, comparing the first information with second information identifying the revision of firmware in the memory of the second controller, and if the revisions of firmware are not equal, then copying the firmware from the memory of the first controller to the memory of the second controller.

BRIEF DESCRIPTION OF THE DRAWINGS

FIG. 2 is a schematic depiction of an alternate embodiment of a storage system in accordance with the present invention;

FIG. 3 is a schematic depiction illustrating a storage cell shown in FIG. 2 in greater detail;

DETAILED DESCRIPTION

The present invention is illustrated and described in terms of a distributed computing environment such as an enterprise computing system using a private SAN. However, the particular storage system configuration is not critical to the present invention.

In the exemplary storage systems described herein, computing systems that access storage are referred to as hosts or host computers. In a typical implementation, a host is any computing system that manages data storage capacity on its own behalf, or on behalf of systems coupled to the host. For example, a host may be a supercomputer processing large databases, a transaction processing server maintaining transaction records, and the like. Alternatively, a host may be a file server on a local area network (LAN) or wide area network (WAN) that provides mass storage services for an enterprise. In direct attached storage systems, a host would be outfitted with one or more disk controllers or RAID controllers that would be configured to manage multiple directly attached disk drives. By contrast, a host connects to a SAN over a high-speed connection, such as a fibre channel (FC) fabric.

The present invention may be implemented in a SAN architecture comprising one or more storage cells, wherein each storage cell comprises a pool of storage devices referred to as a disk group, or a reporting group. Each reporting group comprises redundant storage controllers coupled to the disk group. The storage controllers may be coupled to the storage devices using an FCAL connection, or through a network such as a FC fabric or the like. The storage controllers also may be communicatively coupled through a point-to-point connection such as, for example, a PCI bus, a SCSI bus, or a FC link.

Figure 1:
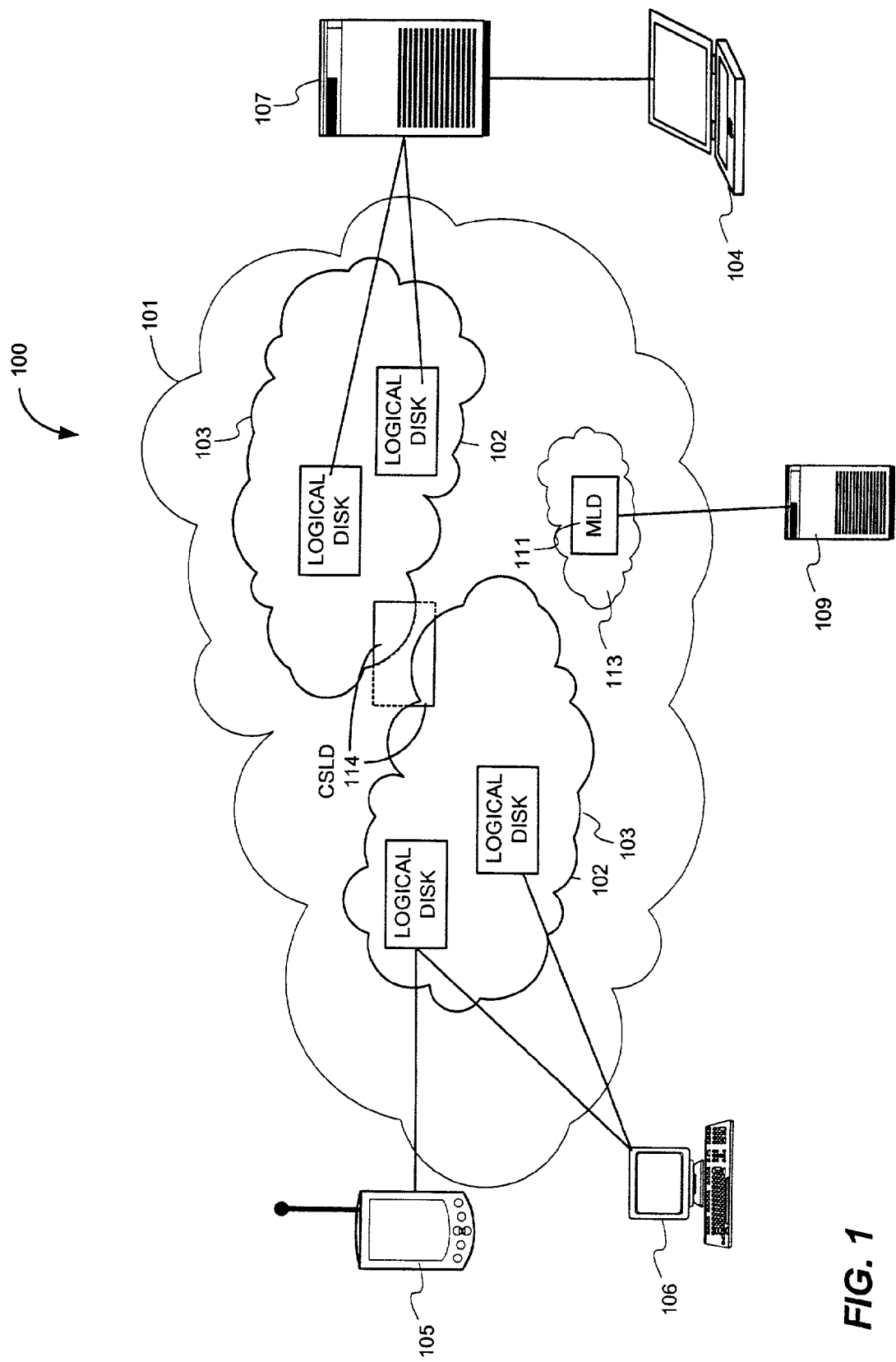
FIG. 1 is a schematic depiction of an exemplary storage system in accordance with the present invention.

FIG. 1 is a schematic depiction of an exemplary SAN environment 100 in which the present invention may be implemented. Environment 100 shows a storage pool 101 comprising an arbitrarily large quantity of storage space from which logical disks (also called logical units or LUNs) 102 may be allocated. In practice, storage pool 101 will have some finite boundaries determined by a particular hardware implementation, however, there are few theoretical limits to the size of a storage pool 101.

In an exemplary embodiment, storage capacity in storage pool 101 is virtualized. Logical device allocation domains (LDADs) 103, which correspond to a set of physical storage devices from which LUNs 102 may be allocated, are defined. LUNs 102 do not span LDADs 103 in the preferred implementations. Any number of LDADs 103 may be defined for a particular implementation as the LDADs 103 operate substantially independently from each other. LUNs 102 have a unique identification within each LDAD 103 that is assigned upon creation of a LUN 102. Each LUN 102 is essentially a contiguous range of logical addresses that can be addressed by host devices 105, 106, 107 and 109 by mapping requests from the connection protocol used by the hosts to the uniquely identified LUN 102.

Host computer 107 may function as a storage server, through which client 104 may access LUNs 102. Server 107 may provide file services to network-connected clients, transaction processing services for a bank automated teller network, telephone call processing services and the like. Hence, client devices 104 may or may not directly use the storage consumed by host 107. It is also contemplated that devices such as computer 106 and wireless device 105, which are also hosts, may logically couple directly to LUNs 102. Hosts 105–107 may couple to multiple LUNs 102, and LUNs 102 may be shared amongst multiple hosts, although in a particular implementation each LUN 102 is presented to a specific host 105–107.

FIG. 2 is a schematic depiction of an alternate embodiment of a storage system in accordance with the present invention. Network 201, such as a fibre channel fabric, interconnects a plurality of storage cells 203. Storage cells 203 are accessible through fabric 201, or by management appliance 109 through LANs/WANs 207. Storage cells 203 essentially implement a storage pool 101. The principal limitation to the number of storage cells that can be included in any SAN is the connectivity implemented by fabric 201. A fabric comprising even a single fibre channel switch can interconnect 256 or more ports, providing a possibility of hundreds of storage cells 203 in a single storage pool 101.

Host 213 includes a host bus adapter, which is a collection of hardware and software that provides a communication connection to fabric 201. The connection to fabric 201 may be through an optical coupling or more conventional conductive cabling depending on the bandwidth requirements. A host bus adapter will often be implemented as a plug-in card on a host computer system. A host 213 may include any number of host adapters to provide a corresponding number of communication connections to fabric 213.

As shown in FIG. 3, each storage cell 203 in the preferred embodiment comprises a pair of network storage controllers (NSCs) 301 coupled by a fibre channel arbitrated loop (FCAL) to a plurality of hard disks located in disk cabinet 303. NSC 301 implements a network interface to receive storage access requests from hosts as well as FCAL ports to connect to storage device in cabinet 303. NSCs 301 may be communicatively coupled by a high-speed connection such as a FC point-to-point connection. While the particular embodiments are illustrated with FC communication links, any communication protocol and hardware that provides sufficient bandwidth for a particular application may be used, including proprietary hardware and protocols.

Figure 4:
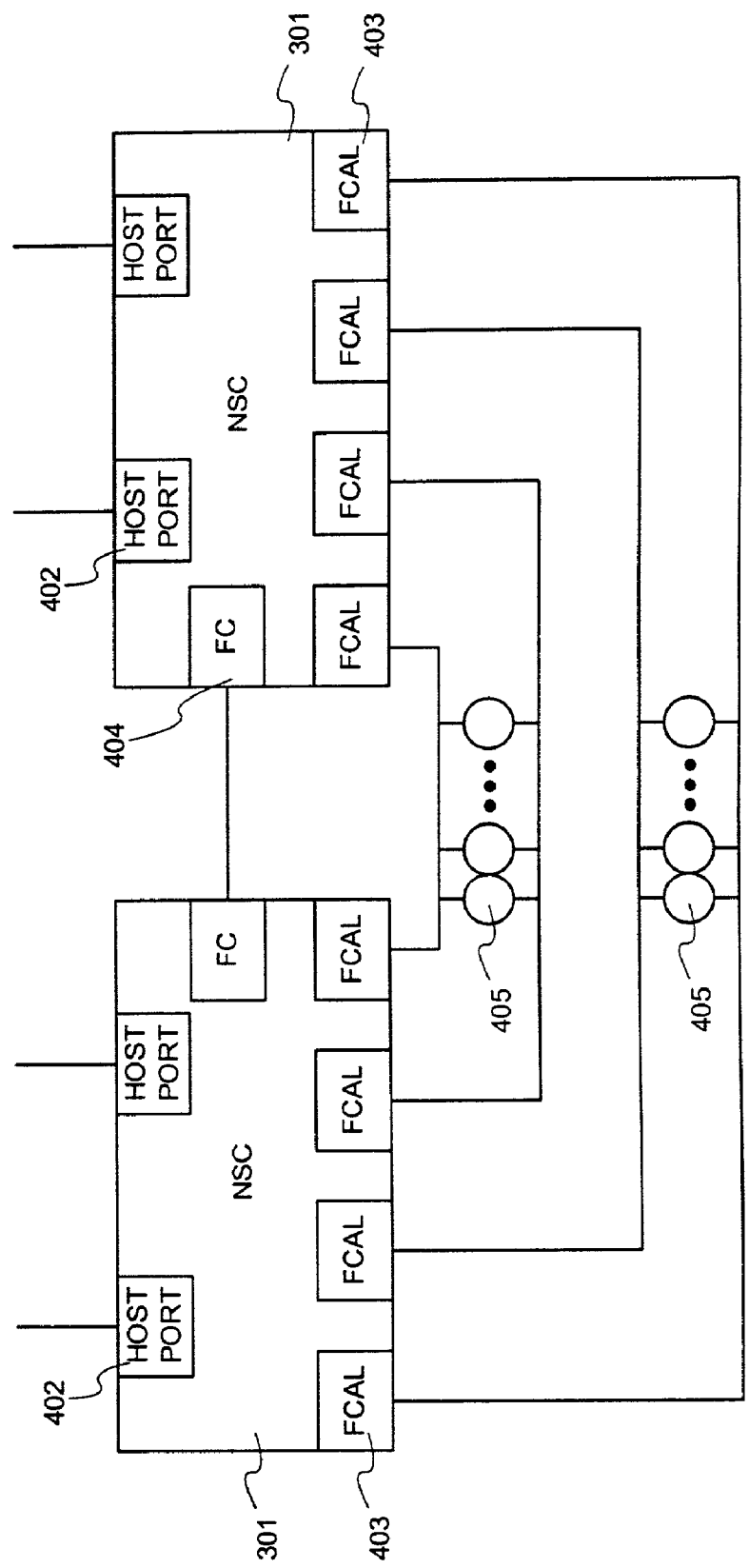
FIG. 4 is a schematic depiction of an alternate embodiment storage cell.

FIG. 4 is a schematic depiction of an exemplary storage cell 203. Referring to FIG. 4, storage cell 203 includes redundant NSCs 301 and a plurality of storage devices 405 connected to the NSCs by redundant communication links. In the embodiment depicted in FIG. 4 the communication links are FCAL links. However, the particular communication protocol governing the communication between the storage devices 405 and NSCs 301 is not critical to the present invention, and the communication links may operate according to other protocols, e.g., SCSI, or may be implemented by a switched fabric, e.g., a FC fabric. NSCs 301 may be embodied as a printed circuit board including one or more microprocessors and associated memory. The processor executes logic, including firmware stored in ROM, for managing communication with storage devices 405. In an exemplary embodiment, each NSC 301 includes redundant copies of firmware. The redundant copies may be referred to as image A, stored in an active ROM segment, and image B, stored in a redundant ROM segment.

NSCs 301 also include a plurality of communication ports 402, 403 and 404. Host adapter ports 402 provide a communication interface to fabric 201 (shown in FIG. 2) and may be implemented as FC N_Ports. Each host adapter port manages communication with fabric 201, and is assigned a fabric-unique port ID in the login process. Dual host port connections on each NSC 301 provide redundancy. In addition, NSCs 301 include ports 404 that support a suitable point-to-point communication link, which may be e.g., a FC connection, a PCI bus, or another suitable communication protocol. In addition, a serial connection may be provided between NSCs 301 as an alternate communication path.

Each NSC 301 includes a plurality of communication ports 403 for communicating with storage devices 405. In an exemplary embodiment, the communication ports 403 may be FCAL ports. Any number of FCAL ports 403 may be implemented in each NSC 301. In the exemplary embodiment depicted in FIG. 4, each NSC 301 includes four FCAL ports 403. FCAL ports 403 are provide communication connections to drives 405. It will be appreciated that a variety of configurations are possible. For example, rather than an FCAL configuration, a switched FC fabric or a SCSI connection could be used to couple to drives 405. The particular FCAL implementation shown allows up to 120 drives in each of two FCAL loops (240 drives per storage cell 203), where each loop is accessible by either NSC 301 to provide redundant connectivity.

As described above, NSCs 301 should run the same firmware revision to function effectively as redundant NSCs. In one aspect, the present invention implements procedures to ensure that NSCs 301 run the same firmware revision. These procedures are set forth in flowcharts in FIGS. 5–6. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions that execute on the computer or other programmable apparatus create means for implementing the functions specified in the flowchart block or blocks.

These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 5:
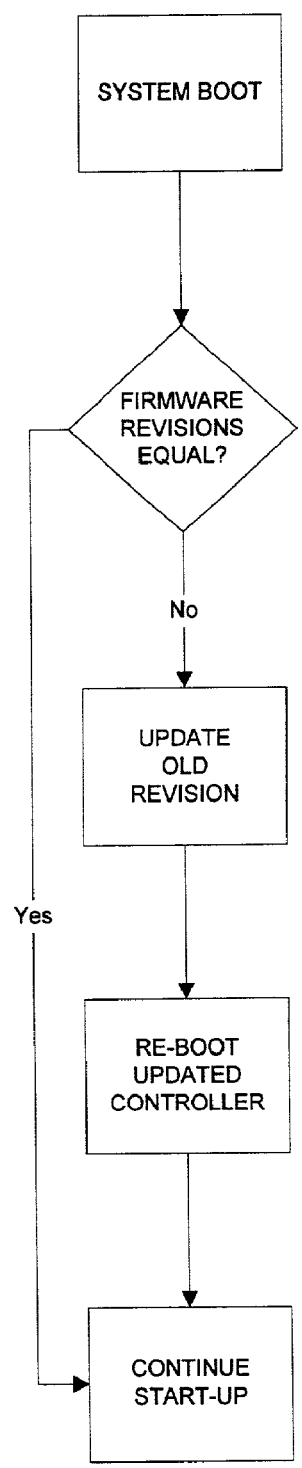
FIG. 5 is a flowchart illustrating a first method of mirroring data in accordance with the present invention.

FIG. 5 illustrates a procedure implemented when the storage cell 203 is initialized for ensuring the NSCs 301 execute the same firmware revision. Referring to FIG. 5, at step 510 the system is initialized. At step 520, it is determined whether the firmware revisions on NSCs 301 are the same. This determination may be performed by comparing information identifying the firmware revision resident in the ROM of each NSC 301. For example, a revision number identifying the firmware revision may be associated with the firmware in ROM. Alternative identifiers may be used such as, for example, dates or checksums.

In an exemplary embodiment, a first NSC 301 is configured to transmit information identifying the firmware revision in its ROM to a second NSC 301. This information may be transmitted across the FCAL link or across a point-to-point connection between the NSCs, e.g., a PCI bus. The second NSC 301 receives the information identifying the firmware revision on the first NSC 301, and compares this information with corresponding information identifying the firmware revision on the second NSC 301.

If the comparison indicates that the firmware revisions are equal, then system initialization may continue without modifying the memory of either NSC 301. By contrast, if the comparison indicates that the firmware revisions are not equal, then the "old" firmware revision is replaced with the "new" firmware revision. By way of example, if the comparison indicates that the firmware revision in the ROM of the second NSC 301 is more recent than the firmware revision in the ROM of the first NSC 301, then the firmware revision in the ROM of the second NSC 301 is copied to the ROM of the first NSC 301. By contrast, if the comparison indicates that the firmware revision in the ROM of the first NSC 301 is more recent than the firmware revision in the ROM of the second NSC 301, then the firmware revision in the ROM of the first NSC 301 is transmitted across the communication link between the NSCs. The transfer may be implemented using a direct memory access (DMA) transfer. When the transfer is complete, the second NSC sends a message to the first NSC to initiate firmware flash into the active segment of the ROM. When the firmware flash is finished, the first NSC 301 reports its status to the second NSC 301. At step 540, the NSC 301 which had its ROM updated is reset, i.e., rebooted, so that the controller operates using the newly revised ROM.

In an alternate embodiment, each controller is configured to transmit its firmware revision number to the other controller during the process of establishing communication over the communication link between the controllers. Both controllers compare the firmware revision numbers. If the comparison indicates that the revision numbers are not equal, then the controller with the most recent firmware revision clones its ROM image into the ROM of the other controller.

In another aspect of the invention, the controllers implement logic to detect backward compatibility failure errors. This is particularly useful, for example, if a controller that replaces a failed controller executes firmware that is incompatible with the hardware on the active controller. The controllers may store in a suitable memory location information identifying firmware revisions that are compatible with the respective controller. If the most recent firmware revision is not compatible with both controllers, then the controller may generate a signal indicative of this incompatibility. In response to the signal, one or more of the controllers may generate an error signal. Alternatively, the controllers may elect to copy the firmware from the ROM of the active controller to the ROM of the controller that replaced the failed controller.

Figure 6:
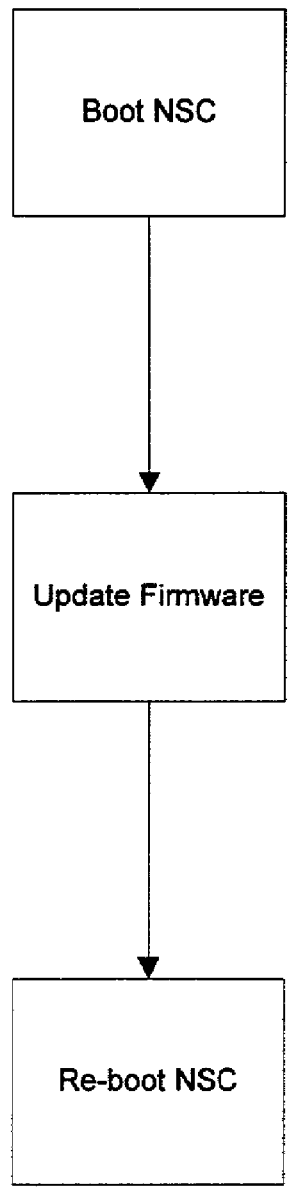
FIG. 6 is a flowchart illustrating a second method of mirroring data in accordance with the present invention.

FIG. 6 illustrates a procedure for ensuring the NSCs 301 execute the same firmware revision which may be implemented when the one of the controllers in a storage cell 203 is replaced during operation of the storage system, e.g., when a NSC fails and is replaced while the storage cell remains operational. The operational NSC will be referred to as the active NSC. The NSC that is being initialized will be referred to as the failed NSC.

Referring to FIG. 6, at step 610 the replaced NSC 301 is started. During the boot-up process the controllers engage in a handshaking procedure to confirm a communication link between the controllers, during which the revision of the firmware on the active controller is transmitted across the communication link between NSCs and flashed to the ROM of the failed controller, ensuring that both controllers have the same firmware revision. Then the failed controller is reset, i.e., rebooted, so that the controller operates using the newly revised ROM.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

What is claimed is:

1. A method of detecting compatibility of an active controller with a replacement controller, comprising the steps of:
    comparing first information identifying a revision of firmware in a memory of the active controller with second information identifying a revision of firmware in a memory of the replacement controller;
    determining a most recent firmware revision of the firmware revisions in the memories of the active and replacement controllers;
    comparing the most recent firmware revision with stored information identifying firmware revisions that are compatible with the active controller;
    comparing the most recent firmware revision with stored information identifying firmware revisions that are compatible with the replacement controller; and
    generating an error signal if the most recent firmware revision is not compatible with both the active and replacement controllers.

2. The method of claim 1, further comprising copying the firmware from the memory of the active controller to the memory of the replacement controller if the revisions of firmware are compatible, but not equal.

3. The method of claim 2, wherein copying the firmware from the memory of the active controller to the memory of the replacement controller includes performing a DMA transfer.

4. The method of claim 2, wherein copying the firmware from the memory of the active controller to the memory of the replacement controller includes flashing the firmware into ROM of the replacement controller.

5. The method of claim 2, further comprising rebooting the replacement controller.

6. The method of claim 1, further comprising copying the firmware from the memory of the replacement controller to the memory of the active controller if the revisions of firmware are compatible, but not equal.

7. The method of claim 6, wherein copying the firmware from the memory of the replacement controller to the memory of the active controller includes performing a DMA transfer.

8. The method of claim 6, wherein copying the firmware from the memory of the replacement controller to the memory of the active controller includes flashing the firmware into ROM of the active controller.

9. The method of claim 6, further comprising rebooting the active controller.

10. The method of claim 1, wherein comparing the first information with the second information is performed in a processor of the replacement controller.

11. The method of claim 1, wherein comparing the first information with the second information is performed in a processor of the active controller.

12. The method of claim 1, wherein the active controller initially includes the most recent firmware revision.

13. The method of claim 1, wherein the replacement controller initially includes the most recent firmware revision.

14. The method of claim 1, wherein the first information and the second information each include at least one of dates and checksums.

* * * * *